(12) United States Patent
Oinen (10) Patent No.: US 6,556,791 B1
(45) Date of Patent: Apr. 29, 2003

(54) DUAL CHANNEL OPTICAL IMAGING SYSTEM

(75) Inventor: Donald E. Oinen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/467,696

(22) Filed: Dec. 21, 1999

(51) Int. Cl.[7] .................. G03B 13/02; G03B 13/06; G03B 13/08
(52) U.S. Cl. .................. 396/373; 356/382; 356/385; 348/64
(58) Field of Search ............... 396/429, 373, 396/385, 382; 348/64

(56) References Cited

U.S. PATENT DOCUMENTS

| | | | |
|---|---|---|---|
| 3,643,574 A | * 2/1972 | Moriyama et al. | 396/107 |
| 3,751,136 A | * 8/1973 | Kirchhoff | 396/107 |
| 4,544,250 A | * 10/1985 | Tanaka et al. | 396/385 |
| 4,714,962 A | 12/1987 | Levine | |
| 4,742,369 A | 5/1988 | Ishii et al. | |
| 4,829,384 A | * 5/1989 | Iida et al. | 348/64 |
| 4,949,117 A | 8/1990 | Van Heyningen et al. | |
| 4,978,983 A | 12/1990 | StAlfors | |
| 5,389,984 A | * 2/1995 | Lovenheim | 396/429 |
| 5,563,736 A | 10/1996 | Lewis | |
| 5,619,257 A | 4/1997 | Reele et al. | |
| 5,664,243 A | 9/1997 | Okada et al. | |
| 5,749,006 A | * 5/1998 | McIntyre et al. | 396/429 |
| 5,822,625 A | 10/1998 | Leidig et al. | |
| 6,041,195 A | * 3/2000 | Honda et al. | 396/429 |
| 6,130,714 A | * 10/2000 | Abe et al. | 396/382 |
| 6,324,346 B1 | * 11/2001 | Miyadera | 396/429 |

* cited by examiner

Primary Examiner—Christopher Mahoney
(74) Attorney, Agent, or Firm—William J. Greener (57) ABSTRACT

An image forming optical system especially suitable as a viewfinder system in an electronic or electronic/film (hybrid) camera includes an objective lens system, an electronic imaging channel, and a visual viewfinding imaging channel. The objective lens system is common to both the electronic and visual imaging channels, and provides a zoom function. The objective lens system is substantially afocal. The optical system includes an optical component that provides at least three reflections for the visual viewfinder image forming light.

24 Claims, 2 Drawing Sheets

FIG. 3

DUAL CHANNEL OPTICAL IMAGING SYSTEM

FIELD OF THE INVENTION

The present invention is generally directed to a hybrid optical and electronic imaging system, and more particularly to such an imaging system suitable for use, for example, as a camera viewfinder.

BACKGROUND OF THE INVENTION

Hybrid cameras (i.e., cameras that capture an image both photographically on a film medium and electronically on a digital medium such as a CCD, as that term will hereinafter be used) are known in which separate or at least partially separate optical systems are used to direct light from an object scene to a film imaging plane, an electronic imaging plane, an ocular lens of a viewfinder, or some combination of these. For example, U.S. Pat. No. 4,714,962 discloses a hybrid camera which uses parallel optical systems for film and electronic capture. U.S. Pat. No. 4,742,369 discloses various hybrid cameras, some of which use a shared optical system for both film and electronic capture, and others of which use parallel optical systems. In an embodiment using parallel optical systems, the '369 patent discloses a camera-supported display for electronically captured images. The display includes a printed line to indicate, for an unspecified range to an object to be photographed, the portion of a displayed electronic image which corresponds to an image captured on film. Commonly assigned U.S. Pat. No. 4,949,117 discloses a hybrid camera of the single lens reflex type in which the film, the electronic imaging device, and the viewfinder share an objective lens system. U.S. Pat. No. 4,978,983 discloses paired film and electronic cameras with parallel optical systems in which the field of view of the electronic imaging device is shown to overlap that of the film. The output of the electronic imaging device is processed so that only that portion of the electronically captured image corresponding to the film image is downloaded to an external display, thereby correcting on the display for parallax between the parallel optical systems.

Hybrid cameras in which a common objective lens system directs light to the film, the electronic imaging device and the viewfinder are free of parallax problems. In contrast, where parallel optical systems are used in a hybrid camera, both vertical and horizontal parallax may exist between the optical system of the viewfinder and the optical systems for film capture and electronic capture. Without appropriate provision for correction of parallax, a user of such cameras may experience difficulty composing images in the viewfinder. For example, in a digital mode the user wants to be able to tell which portion of the field of view of the viewfinder corresponds to that of the optical system for electronic capture, whereas in the film mode the user wants to know which portion corresponds to the field of view of the optical system for film capture. In the hybrid mode the user wants to be sure that the field of view of the viewfinder is such that a desired image will be captured properly both on film and by the electronic imaging device.

In a hybrid camera in which one optical system comprises the camera taking lens system (i.e., the optical train directing light to the "film," as opposed to an electronic imaging device or to the eyepiece) and one or more separate or at least partially separate optical systems for CCD and/or eyepiece imaging, it is desirable to register the film image, the electronic image and the viewfinder image. In other words, the camera user wants the viewfinder image to be substantially identical to the captured electronic and film images, which should also be substantially identical to each other.

Accordingly, there is a need for an optical system suitable, for example, for use as a camera viewfinder that provides a visual image to the user that is the same as the image to be recorded, either digitally, on film, or both.

There is also a need for an optical system suitable, for example, for use as a camera viewfinder, that is compact in design and application, which is more economical than two separate viewfinder optical systems for film and electronic imaging, respectively, and which is environmentally stable.

The optical system described below provides these advantages and others.

SUMMARY OF THE INVENTION

The invention described herein is directed to an image forming optical system and, preferably, to such a system suitable, for example, for use as a viewfinder in a hybrid camera having a separate optical system for capturing an optical image of the object on a film medium.

An embodiment of the optical system includes an electronic imaging channel having an optical axis that forms a first image of an object in an image plane, and a visual imaging channel having an optical axis that is at least in part common with the optical axis of the electronic imaging channel (i.e., having a common optical axis segment) that forms a virtual image of the object in another image plane, adapted to form substantially identical first and second images.

Preferably, the optical system has an afocal 3× or less zoom objective lens system located along the common optical axis segment.

In a preferred embodiment, the optical system is a viewfinder optical system for a hybrid camera. The virtual image is formed in an eyepiece of the visual imaging channel and is viewed, conventionally, by a user bringing the camera in proximity to his/her eye and viewing the object to be photographed. Alternatively, the viewfinder may be in the form of a viewing screen of known types. No photograph need be taken to view the virtual viewfinder image as this is a passive part of the system. The first image is a digital image that is electronically stored and displayed on, for example, an LCD. However, the electronic image capture does not occur until the picture is "taken," and is thus an active part of the optical system. Therefore, while the optical system described herein is a viewfinder, only the passive, visual imaging channel provides a viewfinding image; the active, electronic imaging channel provides a "verification" image of the virtual image seen in the viewfinder and the analog image captured on a film medium.

In an aspect of this embodiment of the invention, the split visual and electronic channels of the optical system are provided by an $n^{th}$ optical element located along the common segment of the optical axis that preferably transmits light from the object for forming a digital image, and which preferably reflects light from the object for viewfinder visual imaging by the user. In a preferred aspect, the optical element is a plate beamsplitter or a beamsplitter cube. The optical system further includes an $m^{th}$ optical element located along the optical axis in the visual imaging channel for sizing, inverting and aiming an intermediate real image to form the virtual image in the viewfinder eyepiece. The $m^{th}$ optical element preferably is a three reflection prism. The entrance and exit surfaces of the prism are preferably plano, but alternatively may have power and aspheric aberration correction.

The optical system further preferably includes a CCD that receives the light of the first image, and an LCD coupled to the CCD for displaying the first image.

Preferably, the viewfinder according to the invention will find particular application in a camera, most preferably in a hybrid camera, and the front to back dimension of the viewfinder will be the limiting front to back dimension of the camera, thus providing a hybrid camera having a thickness less than 24 mm.

The optical components of the digital channel of the optical system according to the invention are preferably glass elements that provide the system with environmental stability against, for example, temperature variations in the camera operating environment. The optical components of the visual channel are preferably plastic elements that provide the system with cost advantages over glass components.

The optical system according to the invention is advantageous for a number of reasons. It provides a viewfinder system that enables an image on an LCD via a CCD, and a virtual image for viewing by the user through the eyepiece where the digital and visual images are substantially identical. Thus, two images of the "same" object are created. The zoom objective lens system is common to the formation of both images thus maintaining the registration of the visual and digital images. Preferably, a hybrid camera incorporating the viewfinder system according to an embodiment of the invention provides a film (analog) image that is also the same as the digital and visual images at any zoom range. Therefore it can be said that what you see is what you get. The optical system further offers compactness in design and a good performance versus cost metric.

DETAILED DESCRIPTION OF A PREFERRED EMBODIMENT OF THE INVENTION

An exemplary embodiment of the invention relates to an optical viewfinder system for a hybrid camera, to an improvement to a hybrid camera when such a camera incorporates the viewfinder system according to the invention, and to a method for capturing images according to the invention. As used herein, a hybrid camera means a camera that forms a visual image on an analog image capture medium such as, e.g., an AgX film medium and a digital image on an electronic image capture medium such as, e.g., a CCD/LCD combination. Hybrid cameras are known, for example, from U.S. Pat. Nos. 5,664,243; 5,619,257; and 5,822,625, the disclosures of which are herein incorporated by reference in their entirety. However, a camera per se forms no part of the invention.

The viewfinder optical system provides for the formation of a virtual image in an eyepiece assembly of the viewfinder, and also provides for the opto-electronic capture of a digital image that can be viewed on a medium such as an LCD, for example. Because a segment of the optical axis of the system is common to both the analog and digital image formation processes, as will be described in detail below, the virtual, visual image and the electronic, digital image are substantially identical. When the viewfinder system according to the invention is incorporated into a hybrid camera, an improvement is realized by the provision that the digital image is captured simultaneously with the film image while both the digital and film images are substantially identical with the virtual viewfinder image seen by the user at the instant of taking the picture. There is thus a verification between the image in the viewfinder, the digital image on the LCD and the (undeveloped) image captured on film. In practical terms, the user identifies the object scene by viewing the virtual viewfinder image, captures the film image by "taking" the picture of the object scene, and is able to view the viewfinder and film captured images by looking at the digital image on the LCD. The user can immediately determine whether the intended scene was actually captured.

In the following examples all distances are in millimeters (mm), the reference surfaces are numbered from front to rear; i.e., from object or subject to the user's eye and/or an image plane, refractive indices are for the sodium D line, field angles are in degrees, and wavelengths are in nanometers (nm).

Figure 1:
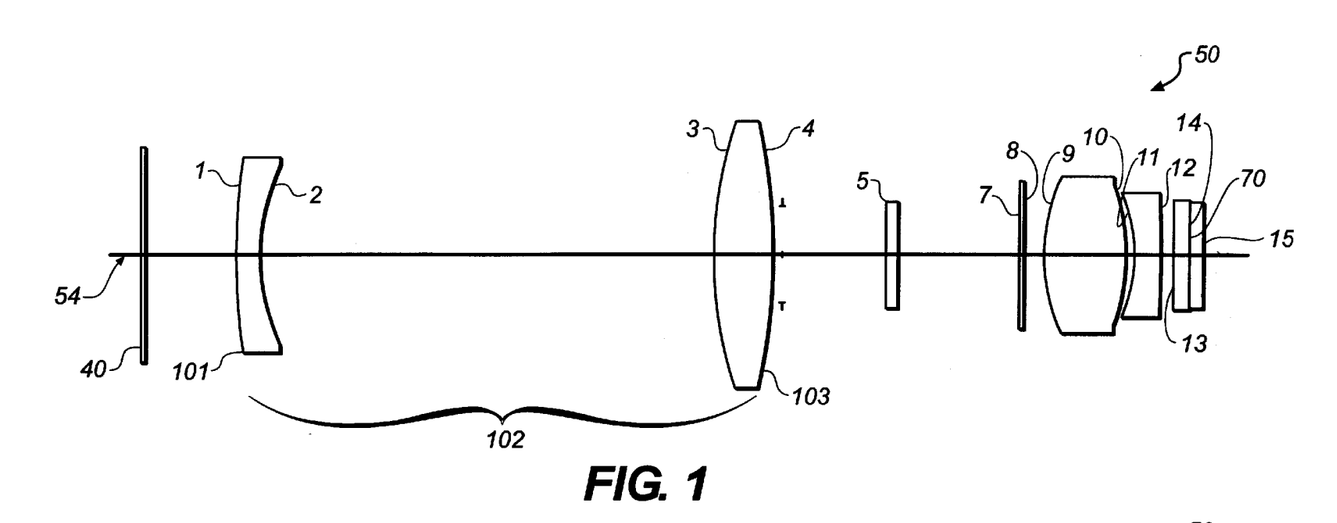
FIG. 1 is a schematic side view layout of the digital imaging channel according to an exemplary embodiment of the invention.
Figure 2:
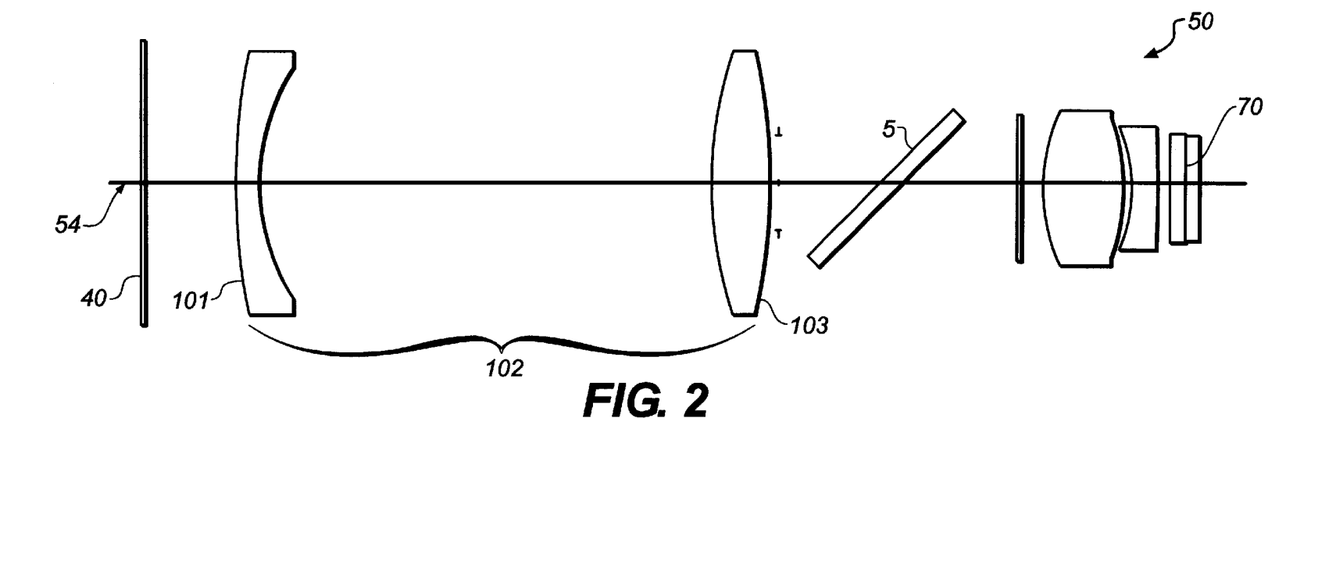
FIG. 2 is a schematic bottom view layout of the digital imaging channel according to an exemplary embodiment of the invention.
Figure 3:
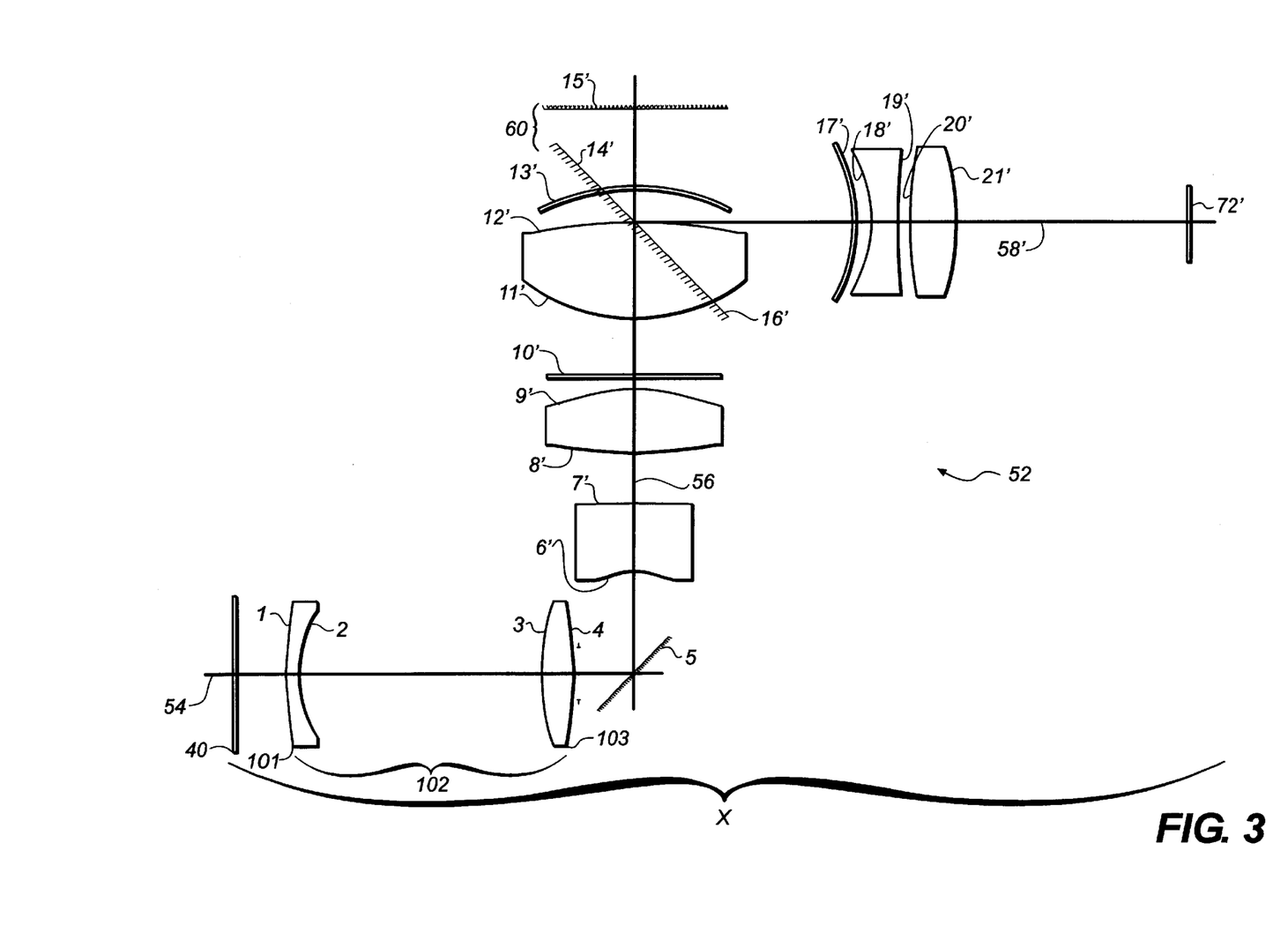
FIG. 3 is a schematic bottom view layout of the visual imaging channel according to an exemplary embodiment of the invention.

FIGS. 1, 2, and 3, respectively, illustrate an exemplary optical system according to the invention. FIGS. 1, 2 represent the electronic image forming channel 50 of the optical system for recording and/or displaying a digital image, and FIG. 3 represents the visual image forming channel 52 for presenting a viewfinder image to a user of the camera. The invention described herein thus preferably describes a viewfinder optical system for a hybrid camera that forms a digital image for viewing and/or storage, and a visual viewfinder image for aiming the camera and framing the subject. Advantageously, the optical system according to the invention includes an objective lens system 102, preferably composed of negative lens component (i.e., lens group or lens element) 101 and positive lens component 103, that is common to both the digital and visual image forming channels. The divergent optical power of lens component 101 allows for a smaller entrance aperture for a given field of view than would be provided by a corresponding converging lens component. The advantages to be appreciated by the negative lens component 101 include camera compactness and aesthetic appeal. The optical axis 54 that intersects the light baffle 40, the objective lens system 102, and an mth optical element 5 (preferably a beamsplitter), is common to the electronic and visual image forming channels 50, 52 respectively. The optical axis of the visual image forming channel 52 is further shown as portion 56 and portion 58, wherein axis portions 54 and 58 are preferably parallel. Objective lens system 102 is preferably an afocal zoom system which provides a zoom range up to about 3×.

Referring generally to FIGS. 1 and 2 which depict the electronic imaging channel 50, light from an object (not shown) enters the entrance (also referred to as the front) of the optical system at the baffle 40. The object is imaged by objective system 102 along optical axis 54 onto the CCD 70 (herein referred to as the first image) after passing through beamsplitter 5 and optical component surfaces 7 through 15. Surfaces 7 and 8 preferably represent a neutral density filter for adjusting the image irradiance on the CCD. An LCD (not shown) is preferably coupled to the CCD 70 and is located on an outer surface, preferably a back surface, of a camera body (not shown) for viewing the digital image of the subject when a shutter is operated.

Referring now to FIG. 3 which depicts the viewfinder visual imaging channel 52, light from the subject propagates along axis 54 to beamsplitter 5 where a portion of the light is directed along axis 56. The light passes through optical component surfaces 6' through 9' and an intermediate real image (herein referred to as the second image) is formed at a $z^{th}$ optical element, preferably a reticle 10'. Reticle 10' preferably is a framed aperture for framing the second image. Light from the real image then passes through optical component surfaces 11' and 12', through an $n^{th}$ optical element, preferably a prism 60 including surfaces 13' through 17', and through optical surfaces 18' through 21'. Light exits the optical system at surface 21' and a virtual image is available for viewing an an eye location 72'. The viewfinder system of the invention is preferably set up to provide viewfinder convergence at between about −1.25 to −1.00 diopters; i.e., to form a virtual image at approximately 80 cm to 100 cm from the object side of eyepiece component surface 21'. Preferably, the distance X between the front and the back of the optical system measured parallel to optical axes 54, 58, is the limiting thickness of the camera. The distance X is preferably less than or equal to 24 mm, and is advantageous for making a compact camera. The advantageous economy of packaging is realized by the combination of the beam splitter 5 and triple reflection prism 60 in the optical imaging path.

The prism 60 has a prism input 13' and a prism output 17' which may or may not have optical power. In an aspect of this embodiment, the prism has a concave input surface 13', three plano reflection surfaces 14', 15', 16' which provide in total a 45 degree bend about the horizontal axis, a second 45 degree bend about the horizontal axis, and a final 45 degree bend about the vertical axis, and a convex output surface 17'. Both the concave and convex surfaces preferably are spherical. The prism 60 provides at least three reflections for the light passing therethrough to reorient and aim the visual image. Any odd integral number of reflections after the beamsplitter is appropriate for the virtual image orientation and viewing.

EXAMPLE I a) Electronic Image Forming Channel Data (with Reference to FIGS. 1 and 2)

EF 3.38–7.40
F/# 2.4

| Semi-Field | 18.80 × 27.72 (Wide Angle) |
| --- | --- |
| | 8.47 × 12.24 (Telephoto) |
| Format | 1.1170 × 1.656 (With Parallax) |
| | 0.9425 × 1.656 (Without Parallax) |

TABLE I

| SURF. | CLEAR APER. | AXIAL BEAM | RADIUS | THICKNESS | GLASS | SPECIAL NOTES |
| --- | --- | --- | --- | --- | --- | --- |
| | 6.74 × 8.83 | 3.06 | BAFFLE | A | | |
| 1 | 6.11 × 8.37 | 3.10 | 20.4791 | 0.750 | 883408 | OHARA S-LAH58 |
| 2 | 5.67 × 7.33 | 3.03 | 6.6466 | B | | |
| 3 | 8.37 | 4.60 | 13.2967 | 1.833 | 835427 | OHARA S-LAH55 |
| 4 | 8.27 | 4.59 | −19.1063 | C | | |
| | 3.03 | 3.03 | DIAPHRAGM | 3.240 | | |
| 5 | 3.31 × 5.96 | 2.33 | PLANO | | 517642 | SCHOTT BK7 |
| 6 | 3.34 × 6.58 | 2.25 | PLANO | | | |
| 7 | 4.61 | 1.47 | PLANO | 0.075 | 660300 | POLYESTER |
| 8 | 4.63 | 1.46 | PLANO | 0.7029 | | |
| 9 | 4.91 | 1.30 | 5.777 | 2.5168 | 883408 | OHARA S-LAH58 |
| 10 | 4.40 | 0.75 | −6.710 | 0.300 | | |
| 11 | 3.90 | 0.59 | −4.789 | 0.810 | 847238 | OHARA S-TIH53 |
| 12 | 3.66 | 0.41 | 46.715 | 0.446 | | |
| 13 | 3.44 | 0.24 | PLANO | 0.500 | 511510 | OHARA FTL8 |
| 14 | 3.28 | 0.10 | PLANO | 0.425 | 529517 | OHARA SSL2 |
| 15 | 3.32 | 0.03 | PLANO | | | |

TABLE II

| EF | BF | BEST FOCUS | N.P. LOC. | N.P. DIAM. | X.P. LOC. | X.P. DIAM. |
| --- | --- | --- | --- | --- | --- | --- |
| 3.380 | 0.03 | −0.03 | 7.16 | 1.41 | 105.47 | 43.93 |
| 3.996 | 0.06 | −0.06 | 8.59 | 1.67 | 105.47 | 43.96 |
| 4.461 | 0.07 | −0.07 | 9.22 | 1.86 | 105.47 | 43.98 |
| 5.438 | 0.07 | −0.07 | 10.14 | 2.27 | 105.47 | 44.10 |
| 6.354 | 0.07 | −0.07 | 10.85 | 2.66 | 105.47 | 44.10 |
| 7.400 | 0.05 | −0.05 | 11.77 | 3.09 | 105.47 | 44.10 |

TABLE III

| EF | LENS LENGTH | STOP DIAM. | REL. APER. | A | B | C | CAMERA TAKING LENS EFL |
| --- | --- | --- | --- | --- | --- | --- | --- |
| 3.380 | 30.35 | 3.03 | 2.40 | 0.000 | 14.284 | 0.300 | 27.70 |
| 3.996 | 30.35 | 3.03 | 2.40 | 1.670 | 11.650 | 1.264 | 31.42 |
| 4.461 | 30.35 | 3.03 | 2.40 | 2.324 | 10.218 | 2.043 | 35.73 |
| 5.438 | 30.35 | 3.03 | 2.39 | 2.891 | 8.010 | 3.684 | 44.80 |
| 6.354 | 30.35 | 3.03 | 2.39 | 2.792 | 6.563 | 5.229 | 53.29 |
| 7.400 | 30.35 | 3.03 | 2.39 | 2.197 | 5.385 | 7.002 | 63.00 |

The focal lengths have been adjusted to fit the field of view of a taking lens with focal lengths ranging from 25.7 to 63.0 with an image format of 27.4×15.6.

TABLE IV

Format and field angles with and without parallax correction:

| | WITH PARALLAX | | WITHOUT PARALLAX | |
|---|---|---|---|---|
| | HORIZONTAL | VERTICAL | HORIZONTAL | VERTICAL |
| CCD FORMAT | 3.313 | 2.234 | 3.313 | 1.885 |
| EFL | | SEMI-FIELD (°) | | |
| 3.380 | 27.68 | 18.78 | 27.68 | 15.88 |
| 3.996 | 23.21 | 15.82 | 23.21 | 13.39 |
| 4.461 | 20.70 | 14.14 | 20.70 | 11.97 |
| 5.438 | 16.86 | 11.57 | 16.86 | 9.80 |
| 6.354 | 14.37 | 9.88 | 14.37 | 8.38 |
| 7.400 | 12.31 | 8.47 | 12.31 | 7.19 |

Lens component focal lengths:
Focal length for Surfaces 1 to 2=−11.37
Focal length for Surfaces 3 to 4=9.59
Focal length for Surfaces 9 to 10=3.86
Focal length for Surfaces 11 to 12=−6.30
The entrance and exit pupil locations are referenced from the front baffle and surface 15 with all plates in place.

Table V summarizes the best compromise heterochromatic MTF performance of the CCD channel at 20 L/MM over the parallax format. Wave-lengths and weights are 656.3 nm, 546.1 nm, 486.1 nm and 35,50,15, respectively.
MTF Orentation:
S/T=Sagittal/Tangential;
H/V=Horizontal/Vertical

TABLE V

| EFL | AXIS (H/V) | MTF TOP (S/T) | SIDE (S/T) | CORNER (H/V) |
|---|---|---|---|---|
| 3.380 | 78/72 | 72/47 | 37/26 | 42/23 |
| 3.996 | 75/73 | 73/52 | 42/37 | 59/42 |
| 4.461 | 71/72 | 70/52 | 38/43 | 66/34 |
| 5.438 | 67/68 | 65/51 | 35/43 | 57/27 |
| 6.354 | 64/65 | 62/52 | 36/47 | 23/29 |
| 7.400 | 62/62 | 60/56 | 40/48 | 28/40 |

Surfaces 13–14 represent the CCD cover glass and surfaces 14–15 represent the CCD epoxy.

The coordinates of the vertex of surface 7 and all subsequent surfaces are displaced in the horizontal direction by 0.16755 mm. Surface 7 is located at 6.84 mm along the Z-axis with respect to the stop. Surfaces 5 and 6 comprise a 0.5 mm thick plate tilted at 45 degrees and coated on the object side to serve as a beam splitter. The horizontal displacement of surface 7 and all subsequent elements is due to the effect of the tilted plate. This tilt displaces the "gut" ray for the center field point. The displacement puts the center field point in the center of the CCD array.

The lens length reported is the distance measured from the plane of the baffle to the image plane along the centerline formed by the vertices of surfaces 1 through 4.

The rectilinear distortion of the wide angle and telephoto focal lengths is shown below.

| WIDE ANGLE | TELE. |
|---|---|
| WORST CASE PAGE BOW = −1.3% | WORST CASE PAGE BOW = 2.2% |
| WORST CASE LINE BOW = −1.8% | WORST CASE LINE BOW = 1.7% | b) Afocal Visual Viewfinder Image Forming Channel Data (with Reference to FIG. 3)

The focal lengths have been adjusted to fit approximately 88% of the field of view of a taking lens with focal lengths ranging from 25.7 to 63.0 mm with an image format of 27.4×15.6. The resultant fraction of the taking lens field of view in wide angle and telephoto are as follows:

| | VERTICAL | HORIZONTAL |
|---|---|---|
| WIDE ANGLE | 85.1% | 90.3% |
| TELEPHOTO | 93.6% | 93.0% |

Eye Relief: 13.9
Semi-Field:

14.48×26.69 (Wide Angle)

6.61×11.47 (Telephoto)

TABLE VI

| SURF. | CLEAR APER. | AXIAL BEAM | RADIUS | THICKNESS | GLASS | SPECIAL NOTES |
|---|---|---|---|---|---|---|
| | 6.74 × 8.83 | 3.10 | Baffle | A | | |
| 1 | 6.11 × 8.37 | 3.10 | 20.4791 | 0.750 | 883408 | OHARA S-LAH58 |
| 2 | 5.67 × 7.33 | 3.03 | 6.6466 | B | | |
| 3 | 8.37 | 4.60 | 13.2967 | 1.833 | 835427 | OHARA S-LAH55 |
| 4 | 8.27 | 4.59 | −19.1063 | C | | |
| | 3.03 | 3.03 | Diaphragm | 3.240 | | |
| 5 | 3.31 × 5.96 | 2.33 | Plano | −5.942 | | REFL. BEAMSPLITTER (MIRROR) |
| 6' | 3.18 × 4.69 | 1.06 | Asphere | −3.909 | 590309 | DOW685 |
| 7' | 4.14 × 6.84 | 0.78 | 214.2158 | −2.958 | | |
| 8' | 5.25 × 9.57 | 0.45 | −23.5217 | −3.174 | 525563 | ZEONEX 480R |
| 9' | 5.75 × 10.30 | 0.15 | Asphere | −0.750 | | |
| 10' | 5.6* × 10.2* | 0.05 | Plano | −6.882 | | FIELD STOP |
| 11' | 7.73 × 13.05 | 0.89 | −10.6618 | −5.579 | 525563 | ZEONEX 480R |
| 12' | 7.25 × 12.10 | 1.21 | Asphere | −2.004 | | |
| 13' | 6.67 × 11.15 | 1.31 | 12.500 | −5.772 | 525563 | ZEONEX 480R PRISM FACE |
| 14' | 9.41 × 10.73 | 2.37 | Plano | 7.500 | | REFL. ZEONEX 480R-PRISM |

TABLE VI-continued

| | | | | | | |
|---|---|---|---|---|---|---|
| 15' | 9.34 × 10.29 | 3.34 | Plano | −8.253 | | REFL. ZEONEX 480R-PRISM |
| 16' | 6.52 × 14.28 | 2.87 | Plano | 12.886 | | REFL. ZEONEX 480R-PRISM |
| 17' | 6.44 × 9.10 | 3.79 | −9.3851 | 1.031 | | PRISM FACE |
| 18' | 8.28 | 3.68 | −7.7269 | 1.500 | 590309 | DOW685 |
| 19' | 8.45 | 3.88 | 40.16704 | 0.750 | | |
| 20' | 8.65 | 4.08 | 25.43669 | 2.666 | 525563 | ZEONEX 480R |
| 21' | 8.68 | 4.32 | −14.77141 | | | |

*Preferably not to exceed)

| EF | N. P. LOC. | N. P. DIAM. | X. P. LOC. | X. P. DIAM. | SEMI-FIELD (FILLS 2.8 × 5.10 FIELD STOP) | | |
|---|---|---|---|---|---|---|---|
| | | | | | TOP | SIDE | CORNER |
| 3.380 | 7.16 | 1.41 | −13.92 | 4.35 | 14.58 | 25.69 | 14.95 × 25.94 |
| 3.996 | 8.59 | 1.67 | −13.92 | 4.35 | 12.30 | 21.57 | 12.26 × 21.60 |
| 4.461 | 9.22 | 1.86 | −13.92 | 4.36 | 11.00 | 19.24 | 10.82 × 19.20 |
| 5.438 | 10.14 | 2.27 | −13.92 | 4.36 | 9.01 | 15.69 | 8.70 × 15.58 |
| 6.354 | 0.85 | 2.66 | −13.92 | 4.37 | 7.70 | 13.38 | 7.36 × 13.24 |
| 7.400 | 11.77 | 3.10 | −13.92 | 4.37 | 6.61 | 11.47 | 6.27 × 11.32 |

Entrance pupil and exit pupil locations are measured from front baffle and last lens surface, respectively.

| EF | STOP DIAM. | APRNT. HFOV | A | B | C | CAMERA TAKING LENS EFL |
|---|---|---|---|---|---|---|
| 3.380 | 3.03 | 9.35 | 0.000 | 14.284 | 0.300 | 27.70 |
| 3.996 | 3.03 | 9.35 | 1.670 | 11.650 | 1.264 | 31.42 |
| 4.461 | 3.03 | 9.35 | 2.324 | 10.218 | 2.043 | 35.73 |
| 5.438 | 3.03 | 9.35 | 2.891 | 8.010 | 3.684 | 44.80 |
| 6.354 | 3.03 | 9.35 | 2.792 | 6.563 | 5.229 | 53.29 |
| 7.400 | 3.03 | 9.35 | 2.197 | 5.385 | 7.002 | 63.00 |

Refractive index data for ZEONEX Z480R:

| WAVELENGTH | 786.5 | 656.3 | 587.6 | 546.1 | 486.1 | 435.8 |
|---|---|---|---|---|---|---|
| INDEX | 1.51862 | 1.52196 | 1.52470 | 1.52692 | 1.53129 | 1.53649 |

By convention, aspheric radius, aspheric terms, and thickness change sign upon reflection. For computational purposes, the following should be used for the lens design setup. Aspheric equation: $SAG = [cy^2/[1+(1-c^2y^2)]] + Dy^4$

| SURF. | RADIUS | CURVATURE | D |
|---|---|---|---|
| 6' | 6.21371 | 0.160934450 | 1.857860E−03 |
| 9' | 14.87332 | 0.067234484 | 1.285630E−03 |
| 12' | 20.69256 | 0.048326548 | −2.008580E−04 |

Signs should be reversed for manufacture.

The following tables summarizes the accommodation and astigmatism in diopers for the visual channel of the finder. Focal lengths are corresponding focal lengths in the CCD channel. Negative accommodation means the bundle is diverging as it exits the eyepiece.

Accommodation

| FIELD/EFL | 3.38 | 3.996 | 4.461 | 5.438 | 6.354 | 7.4 |
|---|---|---|---|---|---|---|
| AXIS | −0.83 | −1.07 | −1.07 | −1.07 | −1.07 | −0.97 |
| TOP | −0.96 | −1.14 | −1.10 | −1.06 | −0.84 | −1.02 |
| SIDE | −0.87 | −0.89 | −0.78 | −0.68 | −0.69 | −0.78 |
| CORNER | −1.03 | −0.97 | −0.83 | −0.66 | −0.67 | −0.85 |

Astigmatism

| FIELD/EFL | 3.38 | 3.996 | 4.461 | 5.438 | 6.354 | 7.4 |
|---|---|---|---|---|---|---|
| AXIS | 0.00 | 0.00 | 0.00 | 0.00 | 0.00 | 0.00 |
| TOP | −0.18 | −0.12 | −0.08 | −0.04 | 0.25 | −0.09 |
| SIDE | 0.09 | −0.16 | −0.28 | −0.37 | −0.36 | −0.17 |
| CORNER | 0.14 | 0.05 | 0.03 | −0.01 | −0.02 | +0.14 |

The rectilinear distortion of the wide angle and telephoto focal lengths is shown below. Maximum line and page bow for each is reported.

| SURF. | RADIUS | CURVATURE | D | THICKNESS | MATERIAL |
|---|---|---|---|---|---|
| 6' | −6.21371 | −0.160934450 | −1.857860E−03 | 3.909 | DOW685 |
| 7' | −214.2158 | | | | |
| 8' | 23.5217 | | | 3.714 | ZEONEX |
| 9' | −14.87332 | −0.067234484 | −1.285630E−03 | | |
| 11' | −10.6618 | | | | |
| 12' | −20.69256 | −0.048326548 | 2.008580E−04 | 5.579 | ZEONEX |

| WIDE ANGLE | TELEPHOTO |
|---|---|
| WORST CASE PAGE BOW = −2.7% | WORST CASE PAGE BOW = −0.7% |
| WORST CASE LINE BOW = −2.0% | WORST CASE LINE BOW = 0.3% |

The invention has been described in detail with particular reference to a preferred embodiment thereof, but it will be understood that variations and modifications can be effected within the spirit and scope of the invention as described hereinabove as defined in the appended claims.

What is claimed is:

1. An image forming optical system, comprising:
    an electronic imaging channel having an optical axis that forms a first image of an object in an image plane, and
    a visual imaging channel having an optical axis that is at least in part common with the optical axis of the electronic imaging channel so as to form a common optical axis segment, that forms a virtual image of the object in another image plane, adapted such that the first image and the virtual image are substantially identical; and
    an objective lens system located along the common segment of the optical axis, the objective lens system including a first optical component having negative power as viewed from an object side, wherein the objective lens system is a zoom objective lens system located along the common optical axis segment providing a zoom ratio that is less than or equal to about 3×.

2. The optical system of claim 1, further comprising:
    an $m^{th}$ optical element located along the common optical axis segment that provides optical transmission for light of the first image and optical reflection for light of the virtual image, and
    an $n^{th}$ optical element located along the optical axis in the visual imaging channel that provides at least three reflections of the light of the virtual image.

3. The optical system of claim 2, further comprising a digital image capture medium located in the electronic imaging channel that receives the light of the first image, and a digital image viewing medium coupled to the digital image capture medium for displaying the first image.

4. The optical system of claim 3, further comprising a filter located in the electronic imaging channel that provides a filter response which matches a response of the digital image capture medium and a response of a viewer's eye positioned along the optical axis of the visual imaging channel.

5. The optical system of claim 2, wherein the mh optical element is a beamsplitter and the $n^{th}$ optical element is a prism.

6. The optical system of claim 6, wherein the beamsplitter is a beamsplitting cube.

7. The optical system of claim 1, wherein said system is a camera viewfinder.

8. The optical system of claim 1, wherein the zoom objective lens system is substantially an afocal optical system.

9. A hybrid camera comprising the optical system according to claim 2.

10. The optical system of claim 1, wherein a distance as measured in a plane parallel to a portion of the electronic imaging channel and the visual imaging channel is less than or equal to 24 mm.

11. An image forming optical system, comprising:
    an electronic imaging channel having an optical axis that forms a first image of an object in an image plane;
    a visual imaging channel having an optical axis that is at least in part common with the optical axis of the electronic imaging channel so as to form a common optical axis segment, that forms a virtual image of the object in another image plane, adapted such that the first image and the virtual image are substantially identical;
    an $m^{th}$ optical element located along the common optical axis segment that provides optical transmission for light of the first image and optical reflection for light of the virtual image;
    an $n^{th}$ optical element located along the optical axis in the visual imaging channel that provides at least three reflections of the light of the virtual image; and
    a light baffle located on the common optical axis segment on an object side of an objective system defining an input plane of the optical system, and a $z^{th}$ optical element located on the optical axis of the visual imaging channel on an object side of the $n^{th}$ optical element defining an output plane of the optical system, wherein the input plane and the output plane are parallel, and further wherein a separation distance between the input and output planes is less than or equal to 24 mm.

12. The optical system of claim 11, wherein the $z^{th}$ optical element is a reticle.

13. A viewfinder optical system for a camera, comprising:
    object in a an electronic imaging channel that forms a digital image of an object in a digital image medium, and
    a visual imaging channel that forms a virtual viewfinder image of the object for viewing by a user of the camera, adapted to form substantially identical first and virtual images, further comprising an optical element that is common to the electronic imaging channel and the visual imaging channel wherein the optical element transmits at least a portion of light from the object to form one of the digital and the virtual images, and
    another optical element having at least three reflective surfaces, located in the visual imaging channel, wherein a distance as measured in a plane parallel to a portion of the electronic imaging channel and the visual imaging channel is less than or equal to 24 mm, and the optical element that is common to the electronic imaging channel and the visual imaging channel includes a zoom lens system.

14. The viewfinder system of claim 13 having a maximum front-to-back dimension wherein said front-to-back dimension defines a limiting thickness of the camera.

15. A viewfinder optical system for a camera, comprising:
    an electronic imaging channel constructed according to the following table:

| SURF. | CLEAR APER. | AXIAL BEAM | RADIUS | THICKNESS | GLASS | SPECIAL NOTES |
|---|---|---|---|---|---|---|
|  | 6.74 × 8.83 | 3.06 | BAFFLE | A |  |  |
| 1 | 6.11 × 8.37 | 3.10 | 20.4791 | 0.750 | 883408 | OHARA S-LAH58 |
| 2 | 5.67 × 7.33 | 3.03 | 6.6466 | B |  |  |
| 3 | 8.37 | 4.60 | 13.2967 | 1.833 | 835427 | OHARA S-LAH55 |
| 4 | 8.27 | 4.59 | −19.1063 | C |  |  |
|  | 3.03 | 3.03 | DIAPHRAGM | 3.240 |  |  |
| 5 | 3.31 × 5.96 | 2.33 | PLANO |  | 517642 | SCHOTT BK7 |
| 6 | 3.34 × 6.58 | 2.25 | PLANO |  |  |  |
| 7 | 4.61 | 1.47 | PLANO | 0.075 | 660300 | POLYESTER |
| 8 | 4.63 | 1.46 | PLANO | 0.7029 |  |  |
| 9 | 4.91 | 1.30 | 5.777 | 2.5168 | 883408 | OHARA S-LAH58 |
| 10 | 4.40 | 0.75 | −6.710 | 0.300 |  |  |
| 11 | 3.90 | 0.59 | −4.789 | 0.810 | 847238 | OHARA S-TIH53 |
| 12 | 3.66 | 0.41 | −46.715 | 0.446 |  |  |
| 13 | 3.44 | 0.24 | PLANO | 0.500 | 511510 | OHARA FTL8 |
| 14 | 3.28 | 0.10 | PLANO | 0.425 | 529517 | OHARA SSL2 |
| 15 | 3.32 | 0.03 | PLANO; and |  |  |  | a visual imaging channel constructed according to the following table:

| SURF. | CLEAR APER. | AXIAL BEAM | RADIUS | THICKNESS | GLASS | SPECIAL NOTES |
|---|---|---|---|---|---|---|
|  | 6.74 × 8.83 | 3.10 | BAFFLE | A |  |  |
| 1 | 6.11 × 8.37 | 3.10 | 20.4791 | 0.750 | 883408 | OHARA S-LAH58 |
| 2 | 5.67 × 7.33 | 3.03 | 6.6466 | B |  |  |
| 3 | 8.37 | 4.60 | 13.2967 | 1.833 | 835427 | OHARA S-LAH55 |
| 4 | 8.27 | 4.59 | −19.1063 | C |  |  |
|  | 3.03 | 3.03 | DIAPHRAGM | 3.240 |  |  |
| 5 | 3.31 × 5.96 | 2.33 | PLANO | −5.942 |  | REFL. BEAMSPLITTER (MIRROR) |
| 6' | 3.18 × 4.69 | 1.06 | ASPHERE | −3.909 | 590309 | DOW685 |
| 7' | 4.14 × 6.84 | 0.78 | 214.2158 | −2.958 |  |  |
| 8' | 5.25 × 9.57 | 0.45 | −23.5217 | −3.174 | 525563 | ZEONEX 480R |
| 9' | 5.75 × 10.30 | 0.15 | ASPHERE | −0.750 |  |  |
| 10' | 5.6* × 10.2* | 0.05 | PLANO | −6.882 |  | FIELD STOP |
| 11' | 7.73 × 13.05 | 0.89 | −10.6618 | −5.579 | 525563 | ZEONEX 480R |
| 12' | 7.25 × 12.10 | 1.21 | ASPHERE | −2.004 |  |  |
| 13' | 6.67 × 11.15 PRISM FACE | 1.31 | 12.500 | −5.772 | 525563 | ZEONEX 480R |
| 14' | 9.41 × 10.73 | 2.37 | PLANO | 7.500 |  | REFL. ZEONEX 480R-PRISM |
| 15' | 9.34 × 10.29 | 3.34 | PLANO | −8.253 |  | REFL. ZEONEX 480R-PRISM |
| 16' | 6.52 × 14.28 | 2.87 | PLANO | 12.888 |  | REFL. ZEONEX 480R-PRISM |
| 17' | 6.44 × 9.10 | 3.79 | −9.3851 | 1.031 |  | PRISM FACE |
| 18' | 8.28 | 3.68 | −7.7269 | 1.500 | 590309 | DOW685 |
| 19' | 8.45 | 3.88 | 40.16704 | 0.750 |  |  |
| 20' | 8.65 | 4.08 | 25.43669 | 2.666 | 525563 | ZEONEX 480R |
| 21' | 8.68 | 4.32 | −14.77141; |  |  |  |

REFRACTIVE INDEX DATA FOR ZEONEX Z480R:

| WAVE-LENGTH | 786.5 | 656.3 | 587.6 | 546.1 | 486.1 | 435.8 |
|---|---|---|---|---|---|---|
| INDEX | 1.51862 | 1.52196 | 1.52470 | 1.52692 | 1.53129 | 1.53649 |

| ASPHERIC EQUATION $SAG = [cy^2/[1 + (1 - c^2y^2)] + Dy^4$ | | | | | |
|---|---|---|---|---|---|
| SURF | RADIUS | CURVATURE | D | THICKNESS | MATERIAL |
| 6' | −6.21371 | −0.160934450 | −1.857860E−03 | 3.909 | DOW685 |
| 7' | −214.2158 | | | | |
| 8' | 23.5217 | | | 3.714 | ZEONEX |
| 9' | −14.87332 | −0.067234484 | −1.285630E−03 | | |
| 11' | −10.6618 | | | | |
| 12' | −20.69256 | −0.048326548 | 2.008580E−04 | 5.579 | ZEONEX, | wherein distances are in millimeters, and the surfaces are numbered from an object side to a viewing side of the viewfinder.

16. In a hybrid camera that provides for capture of an analogue image of an object on a film medium and for capture and viewing of a digital image of the object in an electronic medium, the improvement comprising:

a viewfinder optical system incorporated into the hybrid camera, including an electronic imaging channel having an optical axis that forms the digital image of the object, and a visual imaging channel having an optical axis that has a common segment with the optical axis of the electronic imaging channel, that forms a virtual image of the object in an eyepiece of the viewfinder system, adapted such that the digital image and the virtual image are substantially identical; and an objective lens system located along the common segment of the optical axis, the objective lens system including a first optical component having negative power as viewed from an object side, wherein the objective lens system is a zoom objective lens system located along the common optical axis segment providing a zoom ratio that is less than about 3×.

17. The improved hybrid camera of claim 16, wherein the zoom objective lens system is substantially an afocal optical system.

18. The improved hybrid camera of claim 16, wherein a distance as measured in a plane parallel to a portion of the electronic imaging channel and the visual imaging channel is less than or equal to 24 mm.

19. A method for capturing images, comprising the steps of:

providing a hybrid camera including a viewfinder optical system and a separate image taking optical system, the viewfinder optical system including a common segment having a zoom objective lens system;

forming an analog image of an object on an analog image capture medium with the image taking optical system; and forming a virtual image of the object with the viewfinder optical system and forming a substantially identical digital image of the object on an electronic image capture medium with the viewfinder optical system by passing light from the object through the common segment of the viewfinder optical system, wherein the common segment of the viewfinder optical system includes at least a portion of a system forming the virtual image of the object and at least a portion of a system forming the substantially identical digital image of the object.

20. The method of claim 19, wherein the analog image and the digital image are formed simultaneously.

21. The method of claim 19, wherein the analog image and the digital image each comprises an image content that are substantially identical, and further wherein said image content is substantially identical with an image content of the virtual image.

22. The method of claim 19, wherein forming the virtual image of the object and the digital image of the object comprises using a substantially afocal objective lens system.

23. The method of claim 19, wherein the common segment of the viewfinder optical system includes an objective lens system, the objective lens system including a first optical component having negative power as viewed from an object side of the viewfinder optical system.

24. The method of claim 19, the viewfinder optical system having a front and a back, wherein the viewfinder optical system has an overall length that is less than or equal to 24 mm as measured between the front and the back of the viewfinder optical system.

* * * * *